(No Model.)
G. M. PETERS.
FEEDING MECHANISM FOR CARTRIDGE LOADING MACHINES.
No. 398,651. Patented Feb. 26, 1889.
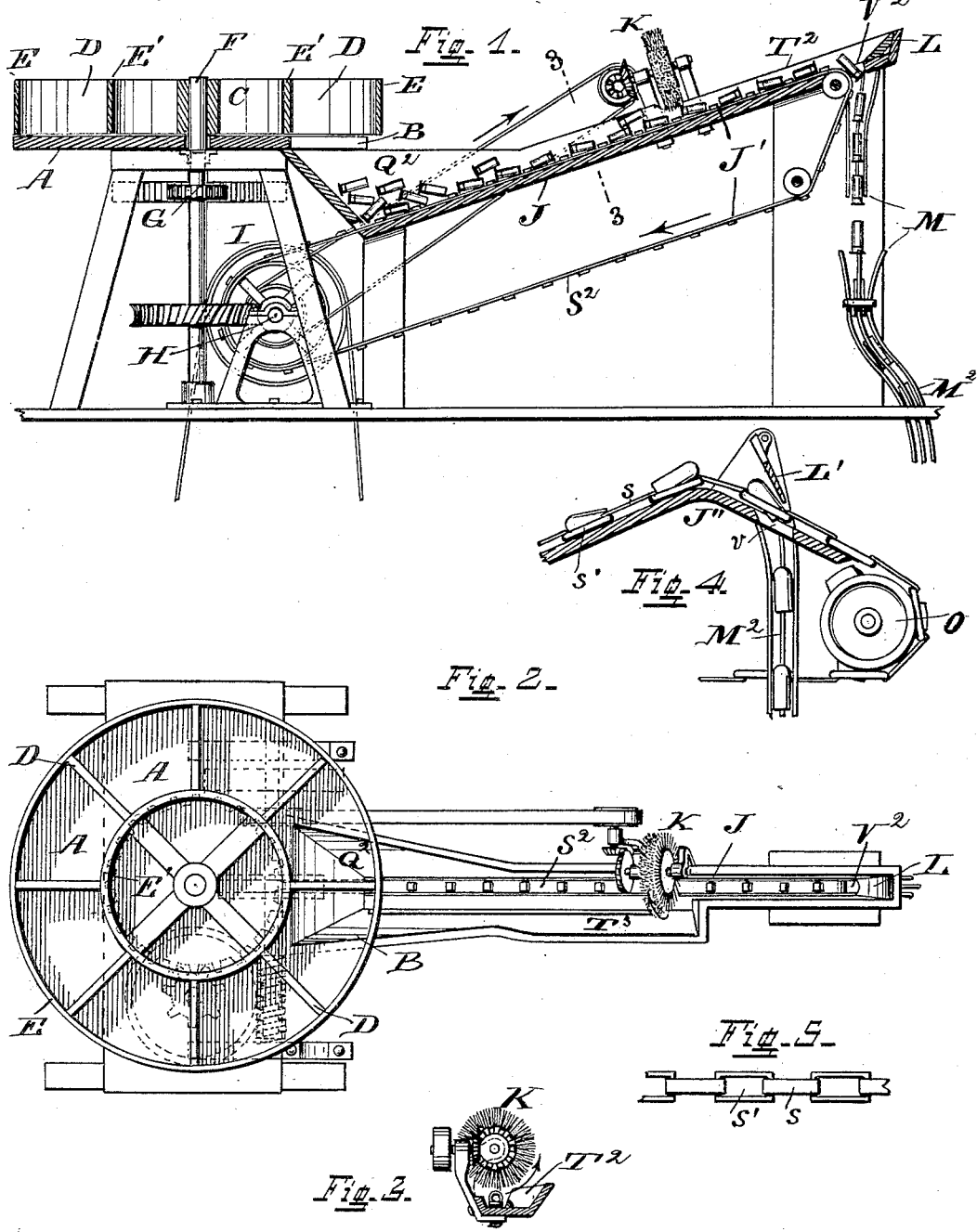
Attest:
Carl Spengel
W. F. Gardner
Inventor
G. M. Peters
By J. N. MacDonald Atty.

UNITED STATES PATENT OFFICE.

GERSHOM MOORE PETERS, OF CINCINNATI, OHIO.

FEEDING MECHANISM FOR CARTRIDGE-LOADING MACHINES.

SPECIFICATION forming part of Letters Patent No. 398,651, dated February 26, 1889.

Application filed November 26, 1888. Serial No. 291,848. (No model.)

*To all whom it may concern:*

Be it known that I, GERSHOM MOORE PETERS, a citizen of the United States, residing at Cincinnati, in the county of Hamilton and State of Ohio, have invented certain new and useful Improvements in Feeding Mechanism for Cartridge-Loading Machines; and I do hereby declare the following to be a full, clear, and exact description of the invention, such as will enable others skilled in the art to which it appertains to make and use the same.

My invention relates to feeding mechanism for feeding shells and balls in cartridge-loading machines, and is an improvement on the device granted to me in Letters Patent No. 360,043, March 29, 1887, and No. 383,905, June 5, 1888. The carrying-belts do not differ materially in operation in either case. The tilting bridge and shell-arresting hook shown in Patent No. 383,905 are now dispensed with.

The device is illustrated in the accompanying drawings, in which—

Figure 1 is a vertical section of the shell-feeding mechanism. Fig. 2 is a top plan view of same; Fig. 3, a detail section of the brush or device for preventing riders; Fig. 4, a detail section of the top of the cage and trough for the ball or bullet feeding; Fig. 5, a plan view of the belt therefor.

Referring more particularly to the drawings, A is a circular stationary table having a portion, B, cut away to afford an opening for the passage of the shells to a hopper, $Q^2$. Passing upward centrally through this table is a shaft, F, to which is secured a horizontally-revolving wheel, C, divided into compartments by blades D, and the outer and inner rims, E E'. The wheel C rests on the stationary table A, and is moved by the shaft F, which is actuated by a gearing meshing with the pinion G, which in turn is connected by means of a screw gearing to shaft H operated by pulley I, the movements of all being so graduated as to give the wheel C a slow movement.

Into the compartments of the wheel C, formed as above described, the shells or balls are thrown promiscuously, and each compartment is moved slowly around to the opening B, discharging its shells into the hopper $Q^2$. This insures a steady feed and at the same time prevents too many shells being in the hopper at one time. The hopper $Q^2$ terminates in a long, narrow, shallow trough, $T^2$, set at an angle of about forty-five degrees. The belt $S^2$, provided with cleats J', passes along the bottom of the trough and catches and moves forward or upward the shells from the hopper. The cleats are regularly distributed along the belt and a little more than the length of a shell apart. The bottom of the hopper and trough being narrow, (scarcely more than the width of a shell,) the shells are obliged to travel lengthwise. Sometimes, however, there will be one shell upon another, and in order to prevent these riders I have placed a brush-wheel, K, about midway the trough, and cause it to revolve at right angles to the trough by means of gear-and-pulley attachments to the driving-pulley I. This brush-wheel will permit one layer of shells to pass beneath it. Any more (or riders) will be brushed off into the side trough, $T^3$, which is set at such angle as to cause the surplus shells or bullets to slide back into the hopper $Q^2$. The upward stream of shells is now one layer in depth, but they are moving sometimes with their butts to the front and sometimes to the rear. As finally placed in the shell-holders, it is necessary that they enter butt foremost. To accomplish this, there is an opening, $V^2$, in the bottom of the upper end of the trough $T^2$. In this opening the shells coming butts forward will immediately tip and proceed through the cage. Those coming with the butts to the rear will be held back by the extra weight of the butt until the open and lighter end passes the opening $V^2$, and is shoved up along the incline L until the butt-end, by the action of the belt, is brought over the opening, when it also drops down right end foremost, and all are conducted by the cage $M^2$ to the shell-placer on the cartridge-machine. To avoid possible clogging in the cage, it is disconnected at M, the ends being slightly spread, and any surplus shells are allowed to drop out into a receptacle, whence they can be again returned to the hopper. This may be done by hand; but a return-belt for this purpose may be operated by the driving-pulley I.

In loading rifle-cartridges the bullets are distributed by means of the wheel C and hopper Q², already described; but the manner of conveying from the hopper to the cage M² is slightly different. It is necessary that the square or concave end of the bullet first enter the cage and descend in this manner to the placer on the loading-machine. To accomplish this a belt, with openings, or a chain having alternately solid and open links, as S S', and moved by the sprocket-wheels O, takes the place of the cleated belt. The openings in the belt or chain are a little wider than the diameter and a little shorter than the length of the bullet, so that one end of the bullet will drop down into the opening while the other end rides on the edge. The end that drops into the opening should always be the square or concave end. To insure this, it is necessary that the depth of the opening should be less than one-half the diameter of the bullet. This will permit the edge always to slide under the pointed or rounded end of the bullet, so holding up the end and permitting the square or concave end to drop first into the opening, which conducts it to the cage M², the opening $v$ in this case being placed not at the end of the belt, but some distance back. When the square end of the bullet is in the rear, it is necessary to relieve its weight from the back end of the opening, so that it will readily turn into the discharge-opening $v$. To accomplish this, the bottom of the trough and belt are turned downward shortly before reaching said opening at J². Should the square end of the bullet come foremost, then the incline will throw its weight onto the front edge of the opening $s'$, and so permit it to ride over the opening $v$ without falling. To prevent this, an obstacle, as L', is presented to stop its progress and throw it off its bearing.

By my device shells and bullets need not require skilled labor and constant attention in distribution, and but one person is needed to feed the shells or bullets to three or more machines. Moreover, the distribution is regular, constant, automatic, and free from the danger of clogging, and the consequent breakage and stoppage of the loading mechanism.

Having thus described my invention, what I claim as new, and desire to secure by Letters Patent, is—

1. In a device of the nature described, the combination, with a hopper, of an inclined trough, a belt passing along the bottom of same, and its actuating mechanism, and a revolving brush placed above the trough and moving across the path of the belt, substantially as and for the purpose set forth.

2. The combination, with the hopper, of an inclined trough tapering to about the width of a shell, a belt suitably actuated and moving along the bottom of said trough, a brush in the path of the belt and revolving at right angles thereto, and a side trough set at an angle to the hopper to receive shells or bullets thrown off by said brush, as set forth.

3. The combination, with a hopper and a belt to draw forward the cartridges, of a gradually-narrowing trough having an outlet-opening in its bottom, and a piece, L, at its upper end inclined at an angle to the bed of the trough to receive the open ends of the shells and lift the same as they are brought to the opening in the trough, substantially as set forth.

4. The combination, with the trough having an opening near its upper end, and a carrying-belt running along said trough, of a cage divided into two separate parts, the delivery end of the upper part being vertically above the receiving end of the lower part, substantially as and for the purpose set forth.

5. The combination of an inclined trough having a downwardly-inclined upper end, J², a belt or chain having at regular intervals openings greater than the width and less than the length of a bullet, and having an obstacle in the path of the bullet for arresting and tilting same, as and for the purpose set forth.

In testimony whereof I affix my signature in presence of two witnesses.

G. MOORE PETERS.

Witnesses:
 CHAS. J. HUNT,
 I. H. MACDONALD.